United States Patent Office

3,487,042
Patented Dec. 30, 1969

3,487,042
PROCESS FOR IMPROVING LIGHTFASTNESS OF AN ACRYLIC POLYMER BY INCORPORATING THEREIN AN ALICYLIC DIONE COMPOUND AND PRODUCT PRODUCED FROM SUCH PROCESS
Brian Pilling, Decatur, Ala., assignor to Monsanto Company, St. Louis, Mo., a corporation of Delaware
No Drawing. Filed June 22, 1966, Ser. No. 559,402
Int. Cl. C08f 47/04
U.S. Cl. 260—41                               18 Claims

ABSTRACT OF THE DISCLOSURE

Improved lightfastness of dyed or pigmented substrates comprised of copolymers and interpolymers derived from acrylonitrile and other mono-olefinic monomers copolymerizable therewith and containing vinyl-substituted tertiary heterocyclic amine groupings is obtained by mixing an alicyclic dione compound with the polymer blend while the polymer blend is in solution.

---

This invention concerns the coloring of substrates comprised of acrylic or modacrylic containing polymers. More specifically, the invention relates to a process of improving the lightfastness of dyed or pigmented substrates comprised of acrylic or modacrylic containing polymers.

The change in hue of colored materials, especially dyed substrates, is a common observation when the substrates are subjected to weathering and sunlight. This phenomenon is commonly known as fading. Explanation of this change in hue or fading has been the subject of extensive research.

To prevent the fading of dyed substrates, the textile industry has chemically treated the dyed substrates with film forming agents to protect the outer layer of the substrate and to prevent the ingress of solar rays. Also the industry has chemically modified the dyes and the substrates to produce more color stable dyes and substrates.

U.S. Patent No. 2,086,337 teaches that dyestuffs containing reactive amino groups can be converted into a more stable dye product by introducing a quinone residue into the amino grouping in the dye molecule. Such an introduction involves a condensation reaction producing a covalent bond between the dye molecule and the quinone residue. As a result, the amino groups are rendered inactive to the future possibility of producing bi-products in an acid or alkali medium, the products of which change the hue.

It has been discovered that quinone compounds form intermolecular complexes with vinyl-substituted tertiary heterocyclic amines in substrates comprised of acrylic containing polymers. Such a complex is formed between an electron acceptor (the quinone compound) and an electron donor (the vinyl-substituted tertiary heterocyclic amine). It was discovered that these complexes enhance significantly the lightfastness of colored substrates, especially substrates dyed a blue hue.

It is therefore an object of this invention to provide a process for improving the lightfastness of dyed substrates comprised of acrylic or modacrylic polymer containing a vinyl-substituted tertiary heterocyclic amine.

It is also an object of the invention to provide a dyed substrate comprised of acrylic or modacrylic polymer containing a vinyl-substituted tertiary heterocyclic amine which exhibits improved lightfastness characteristics.

Other objects of the invention will become apparent as the invention is fully developed within the specification.

These and other objects of this invention are accomplished by providing a process of improving the lightfastness of colored substrates comprised of a polymer selected from the group consisting of acrylic and modacrylic polymers and containing a vinyl-substituted tertiary heterocyclic amine grouping within the polymer comprising mixing an alicyclic dione compound with the polymer while the polymer is in solution.

The term "substrate" as used herein is defined as a film, a woven fabric, a non-woven fabric and any article comprised of an acrylic or modacrylic polymer containing a vinyl-substituted tertiary heterocyclic amine grouping within the polymer. The term "polymer," as used herein, except as otherwise indicated, includes copolymers and interpolymers. The term "monomers" includes mixtures of copolymerizable monomers.

As mentioned previously, the substrate is comprised of an acrylic polymer or a modacrylic polymer containing a vinyl-substituted tertiary heterocyclic amine grouping within the polymer. Useful acrylic polymers include polyacrylonitrile, copolymers containing acrylonitrile units therein, interpolymers containing acrylonitrile units therein and blends of the above. The acrylic polymer should contain at least about 35% by weight of polymerized or copolymerized acrylonitrile units and, preferably, at least about 80% of polymerized or copolymerized acrylonitrile units.

For example, the acrylic polymer can be a copolymer of from about 80 to about 98% of acrylonitrile and from about 2 to about 20% of a vinyl-substituted tertiary heterocyclic amine such as vinyl pyridines and alkyl-substituted vinylpyridines, examples of the later include 2-vinylpyridine, 4-vinylpyridine, and 2-methyl-5-vinyl-pyridine (defined herein as methylvinylpyridine).

The acrylic polymer can also be a ternary interpolymer. Examples of ternary interpolymers include those obtained by the interpolymerization of acrylonitrile, a vinyl-substituted tertiary heterocyclic amine such as vinyl-substituted pyridines and a mono-olefinic monomer selected from the group consisting of alpha-chloroacrylic and methacrylic acids; the acrylates such as methylmethacrylate, ethylmethacrylate, butylmethacrylate, methoxylmethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromo-ethylene; methacrylonitrile; acrylamide and methacrylamide; alpha-chloroacrylamide and monoalkyl substitution products thereof; methylvinyl ketone; vinyl carboxylates such as vinyl acetate, vinyl chloroacetate, vinyl propionate and vinyl stearate; N-vinylimides such as N-vinylphthalimide and N-vinylsuccinimide; methylene malonic esters; itaconic acid and itaconic esters; N-vinylcarbazole; vinyl furane; alkylvinyl esters, vinyl sulfonic acid; ethylene alpha, beta-dicarboxylic acids and their anhydrides and derivatives thereof such as diethylcitraconate, diethylmesaconate; styrene; vinyl naphthalane; 1-vinylimidazole and alkyl-substituted 1-vinylimidazoles such as 5-methyl-1-vinylimidazole; and other similar mono-olefinic copolymerizable materials. A preferred species of the tertiary acrylic polymers includes a polymer containing from about 80 to about 98% of acrylonitrile, from about 1 to about 10% of a vinyl-substituted pyridine and from about 1 to about 18% of a copolymerizable mono-olefinic material selected from the group consisting of methacrylonitrile, vinyl acetate, methyl methacrylate, vinyl chloride, and vinylidine chloride.

The acrylic polymer can also be a blend of one or more copolymers containing acrylonitrile and one of the above enumerated monoolefinic monomers and a polymer such as polyvinyl chloride, providing at least one of the above copolymers containing a vinyl-substituted tertiary heterocyclic amine, such as methylvinylpyridine, and the blend containing at least 70% acrylonitrile units. For example, the acrylic polymer can be a blend containing from about 70 to about 90% of a copolymer of from about 20% of a polymer of a vinyl-substituted halide. 2% to about 20% of vinyl acetate, from about 5% to about 30% of a copolymer of from about 25% to about 75% of acrylonitrile and from about 25% to about 75% of a vinyl-substituted pyridine, and from about 5% to about 20% a o polymer of a vinyl-substituted halide. When the acrylic polymer is a blend, it is preferred that the blend be composed of from about 70 to about 90% of a copolymer of about 80 to about 98% of acrylonitrile and from about 2 to about 20% of another mono-olefinic monomer such as vinyl acetate, from about 5 to about 20% of a copolymer of from about 30 to about 90% of a vinyl-substituted tertiary heterocyclic amine such as vinyl pyridine or methylvinylpyridine and from about 10 to about 70% of acrylonitrile and from about 5 to about 20% of a polyvinyl halide such as polyvinyl chloride or polyvinyl bromide, the blend having an overall vinyl-substituted tertiary heterocyclic amine content of from about 2 to about 10% based on the weight of the blend.

The alicyclic dione compounds useful with the invention include compounds having the quinonoid structure. The alicyclic diones can have aryl groupings, alkyl groupings and halogen groupings attached to the alicyclic ring. Examples of such compounds include p-benzoquinone, o-benzoquinone, diphenoquinone, 1-2-napthoquinone, 1-4-napthoquinone, 9-10-anthraquinone, trichloro-benzoquinone and chloranil. Preferred alicyclic dione compounds include the quinone compounds such as chloranil, diphenoquinone and o-benzoquinone. When halogenated alicyclic diones are used, for example chloranil and like compounds, the incorporation of a minor amount of an alkali metal salt of a lower organic acid is beneficial to improve the lightfastness of the substrate. For example, the use of 1%, based on the weight of the polymer, sodium acetate with chloranil is useful to improve the lightfastness of the substrate.

The exact characteristic or nature of the final product effected by the alicyclic dione compound and the vinyl-substituted tertiary heterocyclic amine is not known. It is thought that the significant effect of the alicyclic dione compounds in the invention is to form intermolecular complexes with the vinyl-substituted tertiary heterocyclic amine. It is known that a condensation type reaction is not effected by the dione compound but that a complex is characteristic of the result.

The amount of alicyclic dione compound useful in the invention should be within the range of from about 1% to less than about 10%, and preferably from about 1.6% to about 5%, the percents based on the weight of the substrate and the substrate containing about 1% dye and from about 3% to about 9% by weight of the vinyl-substituted heterocyclic amine. Based on a molar ratio, there should be present in the substrate at least about 1 mole of the alicyclic dione compound per 7.5 moles of the vinyl substituted tertiary heterocyclic amine, molar ratios up to about 1 mole of the alicyclic dione compound per 2 moles of the heterocyclic amine are also useful.

It is thought that the alicyclic dione compounds in excess of 1.6%, based on the weight of the substrate, effect a bridging among the vinyl-substituted tertiary heterocyclic amines. Such a bridging effect enhances the lightfastness characteristics imparted to the colored substrate. Also, the lightfastness characteristic of the substrate is enhanced where the vinyl-substituted tertiary heterocyclic amines are close together in the polymer, such a closeness facilitates the above described bridging effect.

The substrate can be colored with acid dyes, basic dyes and disperse dyes. Acid dyes are especially useful with the invention and preferably those acid dyes containing a tertiary amino group, for example C. I. Acid Blue 104. To illustrate the invention, C. I. Acid Blue 104 is used in the working examples; this dye is used because of its accepted use in standard test methods for tests the fastness of substrates to light.

To illustrate specific working embodiments of the invention, the following examples are presented. The samples in these examples are tested for percent fade by determining the original optical density of the substrate (unexposed to light radiation), radiating with a light source the sample for a period of time (graduated in hours) and then calculating the percent fade by taking the change (decrease) in optical density and expressing it as a percentage of the original optical density of the unexposed sample. The optical densities of the samples are determined by using a Cary Recording Spectro Photo Meter, Model 11 MS, Serial No. 125, manufactured by Applied Physics Corporation, 2724 South Peck Road, Monrovia, California. Radiation with a light source is accomplished by using an Atlas Fade-O-Meter, type FDA-R, Serial No. 2933, manufactured by Atlas Electrical Devices Co., Chicago, Illinois. The optical density of the sample is a quantitative measure of the amount of the hue or the colorant in the sample and the percent change in optical density or percent fade is a direct measurement of the amount of colorant destroyed or the change in lightfastness of a colored sample. Where percents are used in the composition of the sample, they are based on weight unless otherwise specified.

EXAMPLE I

To a solution containing dimethyl formamide as the solvent and 15%, based on weight of polymer per volume of solution, of an acrylic polymer blend composed of 88% of a copolymer being 93% acrylonitrile and 7% vinyl acetate and 12% of a copolymer being 50% acrylonitrile and 50% methylvinylpyridine, there is added 5% (the percent based on the weight of the polymer) of chloranil. The solution is mixed for 30 minutes at room temperature. Thereafter, 1% (based on the weight of the polymer) of C. I. Acid Blue 104 dissolved in dimethyl formamide is added to the solution and the solution mixed for 10 minutes. Thereafter, a 0.015″ film of the above polymeric solution is cast on a clean glass plate and the plate is placed in an oven at 110°–120° C. for 90 minutes. The film is removed from the plate and mounted on a 2″ by 2″ black card having a ½″ diameter hole punched in one corner of the card. The original optical density of the film is determined and the film is thereafter radiated with light for a period of time (exposure time). At the end of said period of time the optical density of the film is again determined. A control sample, i.e. a sample prepared as described above except the chloranil is absent from the film, is presented to show the significance of the invention. The optical densities, the light radiation times, and the percent fading of the samples are indicated in the following table, Table 1.

TABLE 1

| Exposure time (hours) | Control sample | | Test sample | |
|---|---|---|---|---|
| | Optical density | Percent fade | Optical density | Percent fade |
| 0 (unexposed to radiation) | 1.28 | 0 | 1.76 | 0 |
| 1 | 0.87 | 32 | 1.45 | 17 |
| 2 | 0.68 | 47 | 1.35 | 23 |
| 3 | 0.54 | 58 | 1.26 | 28 |
| 4 | 0.41 | 68 | 1.18 | 33 |
| 5 | 0.32 | 75 | 1.09 | 38 |

As is readily ascertainable from the above results, the chloranil definitely enhances the light fastness of the acrylic substrate.

EXAMPLE II

To a solution containing dimethyl acetamide and 10%, based on weight per volume, of an acrylic polymer blend described in Example I, there is added 5% (based on weight of the polymer) of chloranil and 1% (based on the weight of the polymer) of C. I. Acid Blue 104. The composition solution is mixed at room temperature for 30 minutes. A 0.015" film of the polymeric solution is cast on a clean glass plate and the film dried for 30 minutes in an oven at 80°–90° C. The film is mounted on a 2" x 2" black card having a ½" diameter hole punched in one corner thereof. The optical density of the film is determined and the film is then exposed to light radiation and the optical density of the film is again determined. The results of the test are indicated below in Table 2 (a control sample, i.e. an identical film except it does not contain chloranil, is presented for comparison purposes):

TABLE 2

| Exposure time (hours) | Control sample, percent fade | Test sample, percent fade |
|---|---|---|
| 1 | 59 | 11 |
| 2 | 78 | 25 |
| 3 | 88 | 33 |
| 4 | 91 | 41 |
| 5 | 93 | 48 |

The above results indicate the significance of the alicyclic dione compound to inhibit light fading of a colored substrate.

EXAMPLE III

The procedure of Example II is repeated except diphenoquinone is used in place of the chloranil. A control sample, i.e. a sample which does not contain the diphenoquinone, is presented for comparison purposes. Table 3 indicates the exposure times and the results of the testing.

TABLE 3

| Exposure time (hours) | Control sample, percent fade | Test sample, percent fade |
|---|---|---|
| 1 | 21 | 1 |
| 2 | 51 | 2.2 |
| 3 | 68 | 12 |
| 4 | 70 | 18 |
| 5 | 79 | 21 |

EXAMPLE IV

To acrylic polymer solutions containing 100 grams of an acrylic polymer blend composed of 88% of a copolymer being 93% acrylonitrile and 7% vinyl acetate, 12% of a copolymer being 50% acrylonitrile and 50% methylvinyl pyridine and 666 grams of dimethylacetamide, there is added the below indicated amounts of chloranil (the amounts are given in percents and the percents are based on weight of the polymer) and 1% of C. I. Acid Blue 104. The total amount of the methylvinyl pyridine present in the acrylic polymer solutions is 0.05 mole, the molar amount of the dye is 0.0013 mole of C. I. Acid Blue 104 and the molar amounts of the chloranil are: 1% is 0.0041 mole, 2% is 0.0082 mole, 3% is 0.0123 mole and 4% is 0.0164 mole. The resulting solutions are thoroughly mixed. Films of the different samples are cast on clean glass plates using a Gardner knife set at 0.015" and the plates are placed in an oven at 110°–120° C. for 90 minutes. The films are mounted on a 2" x 2" black card having a ½" diameter hole punched in one corner. These films are then tested for percent fade and the results are indicated in the following table, Table 4:

TABLE 4

| Exposure time (hours) | Control sample (percent fade) | Test sample (percent fade) | | | |
|---|---|---|---|---|---|
| | | 1% chloranil | 2% chloranil | 3% chloranil | 4% chloranil |
| 0 | 0 | 0 | 0 | 0 | 0 |
| 1 | 21 | 31 | 19 | 13 | 8 |
| 2 | 51 | 60 | 33 | 34 | 23 |
| 3 | 68 | 79 | 53 | 47 | 35 |
| 4 | 76 | 88 | 62 | 58 | 45 |
| 5 | 79 | 88 | 68 | 64 | 52 |

These above data indicate the significance of the alicyclic dione compound, i.e. there must be present within the polymer a sufficient amount of quinone compound to complex with the vinyl-substituted tertiary heterocyclic amine compounds. One percent of the chloranil is inefficient, but 2% is sufficient to enhance the lightfastness of the substrate. Also these above data indicate the improvement in lightfastness as the concentration of the quinone compound is increased.

EXAMPLE V

The procedure of Example IV is repeated except 1% of sodium acetate is incorporated into each sample. The fading results are indicated in Table 5:

TABLE 5

| Exposure time (hours) | Control sample (percent fade) | Test sample (percent fade) | | | |
|---|---|---|---|---|---|
| | | Percent chloranil+1% sodium acetate | | | |
| | | 1% | 2% | 3% | 4% |
| 0 | | | | | |
| 1 | 21 | 26 | 14 | 10 | 9 |
| 2 | 51 | 50 | 39 | 23 | 17 |
| 3 | 68 | 67 | 57 | 35 | 27 |
| 4 | 76 | 76 | 66 | 46 | 35 |
| 5 | 79 | 80 | 72 | 51 | 39 |

The above results indicate the significance of the sodium acetate when the alicyclic dione compound is halogenated, such as chloranil.

It is to be understood that the above examples are presented merely to illustrate specific working embodiments of the invention. It is acknowledged that similar dyes, similar types of alicyclic dione compounds and other vinyl-substituted tertiary heterocyclic amines can be substituted for those illustrated in the above examples. Also different operating conditions can be incorporated into these examples.

What is claimed is:

1. A process of improving the lightfastness of a colored substrate comprised of a polymer selected from the group consisting of acrylic copolymers, modacrylic copolymers and blends of acrylic and modacrylic copolymers, said polymer containing as an integral part of the polymeric chain structure a vinyl substituted tertiary heterocyclic amine grouping, comprising mixing an alicyclic dione compound with said polymer in an amount to provide in said substrate at least 1 mole of said alicyclic dione compound per 7.5 moles of said vinyl substituted tertiary heterocyclic amine grouping.

2. The process of claim 1 wherein the substrate is colored with an acid dye.

3. The process of claim 1 wherein the substrate is comprised of an acrylic polymer.

4. The process of claim 1 wherein the vinyl-substituted tertiary heterocyclic amine grouping is methylvinyl-pyridine.

5. The process of claim 1 wherein the alicyclic dione compound is halogenated.

6. A process of improving the lightfastness of a colored substrate comprised of a polymer selected from the group consisting of acrylic copolymers, modacrylic copolymers and blends of acrylic and modacrylic copolymers, said polymers containing as an integral part of the polymeric chain structure a vinyl substituted tertiary heterocyclic amine grouping, comprising mixing an alicyclic dione compound selected from the group consisting of p-benzoquinone, o-benzoquinone, diphenoquinone, 1-2-naphthoquinone, 1-4-naphthoquinone, 9-10-anthraquinone, trichloro-benzoquinone and chloranil with said polymer in an amount to provide in said substrate at least 1 mole of said alicyclic dione compound per 7.5 moles of said vinyl substituted tertiary heterocyclic amine grouping.

7. The process of claim 6 wherein the substrate is colored with an acid dye.

8. The process of claim 6 wherein the substrate is colored with a dye containing a tertiary amino grouping.

9. The process of claim 6 wherein the vinyl-substituted tertiary heterocyclic amine grouping is methylvinylpyridine.

10. The process of claim 6 wherein the alicyclic dione compound is chloranil.

11. The process of claim 10 wherein about 1% of sodium acetate, the percent based on the weight of the polymer, is mixed with the polymer.

12. The process of claim 6 wherein the alicyclic dione compound is diphenoquinone.

13. A process of improving the lightfastness of a colored substrate consisting essentially of a blend of an acrylic polymer and a modacrylic polymer, said acrylic polymer being derived from acrylonitrile and at least 1 other mono-olefinic monomer copolymerizable therewith, said modacrylic polymer being derived from acrylonitrile and a vinyl substituted tertiary heterocyclic amine copolymerizable therewith, comprising mixing with the polymer an alicyclic dione selected from the group consisting of p-benzoquinone, o-benzoquinone, diphenoquinone, 1-2-naphthoquinone, 1-4-napthoquinone, 9-10-anthraquinone, trichloro-benzoquinone and chloranil, in an amount to provide in said substrate at least one mole of said alicyclic dione compound per 7.5 moles of said vinyl substituted tertiary heterocyclic amine.

14. The process of claim 13 wherein said vinyl substituted tertiary heterocyclic amine is selected from the group consisting of vinyl pyridine and alkyl substituted vinyl pyridine.

15. The process of claim 13 wherein the alicyclic dione compound is chloranil.

16. The process of claim 13 wherein the alicyclic dione compound is diphenoquinone.

17. A colored substrate comprised of a polymer selected from the group consisting of acrylic and modacrylic polymers and containing a vinyl-substituted tertiary heterocyclic amine grouping within the polymer treated by the process of claim 1.

18. A colored substrate comprised of an acrylic polymer containing a vinyl-substituted tertiary heterocyclic amine grouping within the polymer treated by the process of claim 6.

References Cited

UNITED STATES PATENTS

| | | |
|---|---|---|
| 2,086,337 | 7/1937 | Schirm. |
| 2,661,344 | 12/1953 | Slocombe et al. _____ 260—45.7 |
| 3,331,811 | 5/1964 | Schafer _____ 260—45.7 |

ALLAN LIEBERMAN, Primary Examiner

U.S. Cl. X.R.

260—45.7

UNITED STATES PATENT OFFICE
CERTIFICATE OF CORRECTION

Patent No. 3,487,042            December 30, 1969

Brian Pilling

It is certified that error appears in the above identified patent and that said Letters Patent are hereby corrected as shown below:

Column 3, line 10, "20% of a polymer of a vinyl-substituted halide." should read -- 80 to about 98% of acrylonitrile and from about --.

Signed and sealed this 17th day of November 1970.

(SEAL)
Attest:

Edward M. Fletcher, Jr.            WILLIAM E. SCHUYLER, JR.
Attesting Officer                    Commissioner of Patents